United States Patent [19]

Lin et al.

[11] 4,124,818
[45] Nov. 7, 1978

[54] ARRANGEMENT FOR MONITORING SIGNAL-TO-INTERFERENCE RATIO IN A RADIO TRANSMISSION SYSTEM

[75] Inventors: Sing H. Lin, Holmdel; Yu S. Yeh, Freehold Township, Monmouth County, both of N.J.

[73] Assignee: Bell Telephone Laboratories, Incorporated, Murray Hill, N.J.

[21] Appl. No.: 839,299

[22] Filed: Oct. 4, 1977

[51] Int. Cl.² .................. H04B 17/00; G01R 27/00
[52] U.S. Cl. .................................. 325/363; 325/65; 324/57 N
[58] Field of Search .................. 325/363, 65, 67, 472, 325/473, 474, 477; 324/57 N

[56] References Cited
U.S. PATENT DOCUMENTS

| | | | |
|---|---|---|---|
| 3,737,781 | 6/1973 | Deerkoski | 325/363 |
| 3,835,378 | 9/1974 | Edden et al. | 325/363 |
| 3,947,770 | 3/1976 | Cavanagh et al. | 325/363 |

Primary Examiner—Robert L. Richardson
Assistant Examiner—Tommy P. Chin
Attorney, Agent, or Firm—Burton I. Levine; Sylvan Sherman

[57] ABSTRACT

A multiplex radio transmission system is provided with facilities for initiating protective switching from a working channel to an idle channel of the system when the signal to interference ratio on the working channel falls below a predetermined threshold value. A precise square-law detector derives, from the separate information and interference components of a signal on the working channel, a DC component and a difference-beat AC component which are processed to yield a quantity indicative of the desired signal to interference ratio. When such ratio falls below the predetermined threshold value, switching to an idle channel occurs in a manner similar to conventional signal-to-noise dependent protective switching arrangements.

5 Claims, 2 Drawing Figures

ARRANGEMENT FOR MONITORING SIGNAL-TO-INTERFERENCE RATIO IN A RADIO TRANSMISSION SYSTEM

BACKGROUND OF THE INVENTION

The invention relates to multiplex radio transmission systems and more particularly to facilities in such systems for initiating protective switching from a working channel to an idle channel.

In a typical multiplex radio transmission system, a large number of voice circuits may be accommodated on one of a plurality of radio channels each occupying a frequency spread of about 20 MHz. Most of the radio channels of the multiplex system are employed as working channels; however, a certain number, usually in a ratio of 1:10 to the working channels, are reserved as idle channels. Signals on a working channel are selectively switched to an idle channel via a protective switching apparatus when the level of a prescribed spurious component on the channel, relative to that of the desired signal level thereon, increases above a predetermined value.

Existing protective switching facilities of this type generally operate in dependence on the relative level of baseband thermal noise on the associated working channel. When the desired information signal on the channel is sufficiently attenuated (e.g., in the presence of atmospheric disturbances such as multipath fading and rain attenuation), the thermal noise level relative to the signal rises substantially from its normal value (e.g., at least −50 dB) measured after down-conversion to baseband. As soon as the signal-to-noise ratio under such conditions drops to about 15 dB, the voice circuits on the affected radio channel are switched to an idle channel by means of the protective switching facilities.

In order to reliably operate such switching facilities in the past, it has been necessary to fairly accurately determine the relative noise level at baseband. Because it is extremely difficult to measure baseband thermal noise directly in the presence of signal, and further because such thermal noise characteristically increases in square law fashion with frequency, it has been common to measure the noise level at a frequency far enough above baseband so that there is no appreciable signal amplitude to interfere with the measurement. The so-measured noise level is then extrapolated downward to baseband to approximate the relative noise level for purposes of establishing the level for channel switching.

Unfortunately, when the desired signal component on the working channel is also accompanied by interference (e.g., crosstalk between channels), the determination of the threshold level for channel switching initiation is difficult because such interference does not obey the square law of baseband noise.

SUMMARY OF THE INVENTION

To avoid this problem, the present invention provides an arrangement for continually and accurately deriving the signal-to-interference ratio on a working channel of a mulitplex radio transmission system. When the monitored ratio falls below a predetermined threshold value, switching to an idle channel is initiated in a manner similar to that employed in conventional signal-to-noise dependent protective switching arrangements.

In an illustrative embodiment, a received interference-susceptible signal is applied to the input of a first precise square-law detector which derives a DC component and at least one AC component having a frequency corresponding to the difference between the information and interference frequencies. The output of such first detector is applied in parallel to (a) a first branch including at least a first low-pass filter and a first logarithmic amplifier, and (b) a second branch including at least a bandpass filter, a second square-law detector, a second low-pass filter and a second logarithmic amplifier. The bandpass filter in the second branch, which is adapted to pass voltages of frequencies equal to the difference between the information and interference components of the incoming signal, has a passband extending down to but not including zero frequency.

The outputs of the first and second branches are respectively applied to the first and second inputs of a subtracting circuit. The output of such subtracting circuit is proportional to the signal-to-interference ratio of the incoming interference-susceptible signal, and may be employed in a conventional manner to initiate channel switching when such ratio falls below a predetermined threshold value.

BRIEF DESCRIPTION OF THE DRAWING

The invention is further set forth in the following detailed description taken in conjunction with the appended drawing, in which.

DETAILED DESCRIPTION

Figure 1:
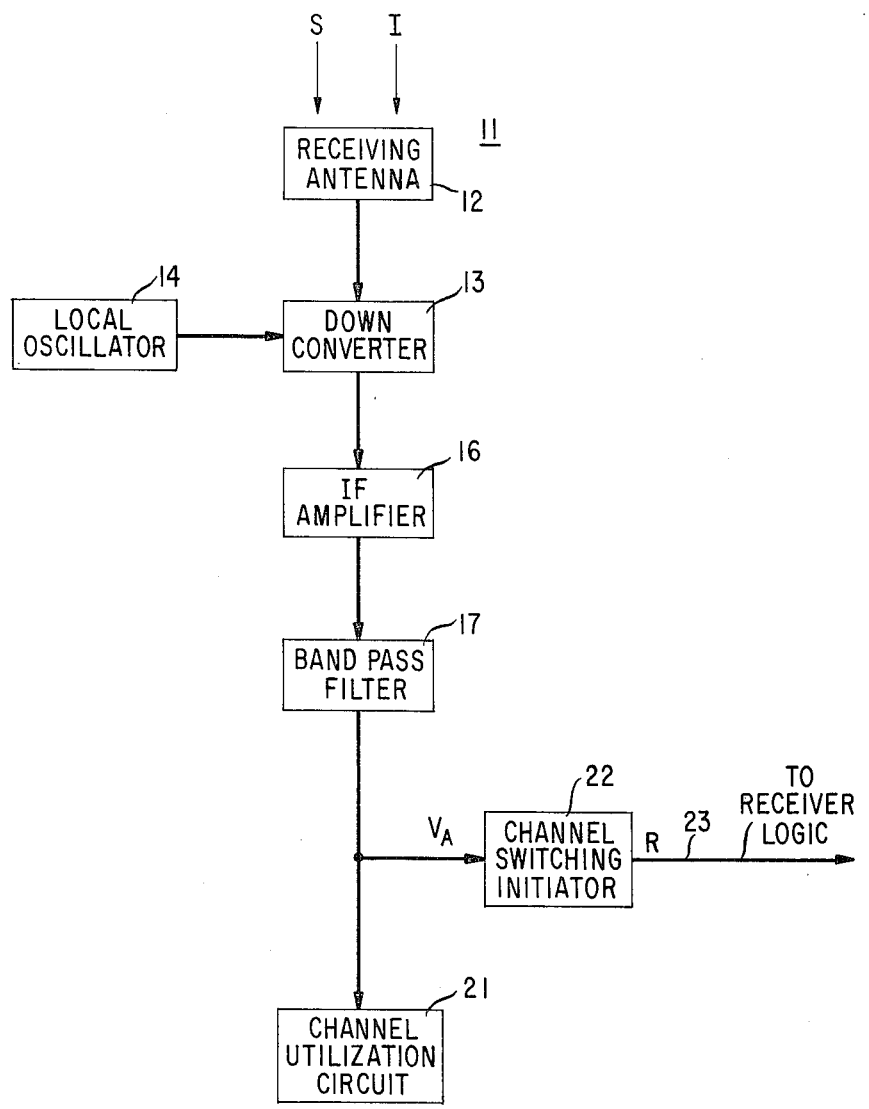
FIG. 1 is a block diagram of a portion of a microwave radio receiving station having facilities for initiating switching of an incoming signal from a working to an idle channel of the associated radio system.

Referring now to the drawing, FIG. 1 depicts, to the extent relevant to the present invention, the RF and IF portions of a radio main station 11 of a microwave radio transmission system. The station 11 is adapted to normally receive radio information signals incident on one of a plurality of regular or working channels or, selectively, one of a plurality of idle or protection channels, the number of which is selected in approximately a 1:10 ratio to the working channels. The station 11 is provided with facilities for initiating a switching operation from the assigned working channel to one of the idle channels as described below.

The station 11 includes a conventional radio receiving antenna 12, which as schematically depicted in the drawing simultaneously receives a desired information signal S and a spurious component I, where I<S. For present purposes, the component I is assumed to constitute interference in the form of either cochannel interference or interchannel crosstalk; both of the latter components will be generically designated "interference" for present purposes.

The information signal S, together with the interference component I, are coupled from the antenna 12 to a down-converter 13, where the combined signal-interference signal is beat down to IF (e.g., 70 MHz) by a local oscillator 14. The output of the convertor 13 is applied, via an IF amplifier 16, to the input of a conventional IF band-pass filter 17. The resulting bandwidth-limited IF signal (designated $V_A$) at the output of the filter 17 is represented by $$V_A = S + I = S_O \cos(\omega_S t + P_S) + I_O \cos(\omega_I t + P_I),$$

where $S_O$ is the amplitude of the information signal, $I_O$ is the amplitude of the ratio interference component, $\omega_S$ is the angular frequency of the information signal, $\omega_I$ is the angular frequency of the interference, $P_S$ is the phase shift of the information signal from a reference value, and $P_I$ is the phase shift of the interference from the reference value.

The output of the filter 17 is applied to a conventional channel utilization circuit 21 for further processing. Such utilization circuit 21 is bridged by an IF protection channel switching initiator 22. The initiator 22 selectively generates, at an output 23 thereof, a switch request to the receiver logic (not shown) at the station 11. Upon such request, the logic switches the signal to an idle channel.

Typically, the initiator is arranged to operate when the ratio of the amplitude of the information signal S to the thermal noise on the working channel falls below a predetermined value; further details of such a signal-to-noise dependent switching initiator are given, e.g., in an article by Griffiths et al, "100A Protection Switching System", Bell System Technical Journal, Vol. 44, pages 2295–2336 (December 1965). In accordance with the present invention, however, the switching initiator 22 is adapted to activate the switch request output 23 when the signal to interference ratio $$R = 10 \log_{10} \frac{S_O^2}{I_O^2}$$

on the working channel, rather than the signal-to-noise ratio, falls below a predetermined value. (As will be seen later, such improved initiator will be effective to provide the desired switch request capability when the desired information signal is accompanied by a combination of interference and noise, as well as interference alone.)

Figure 2:
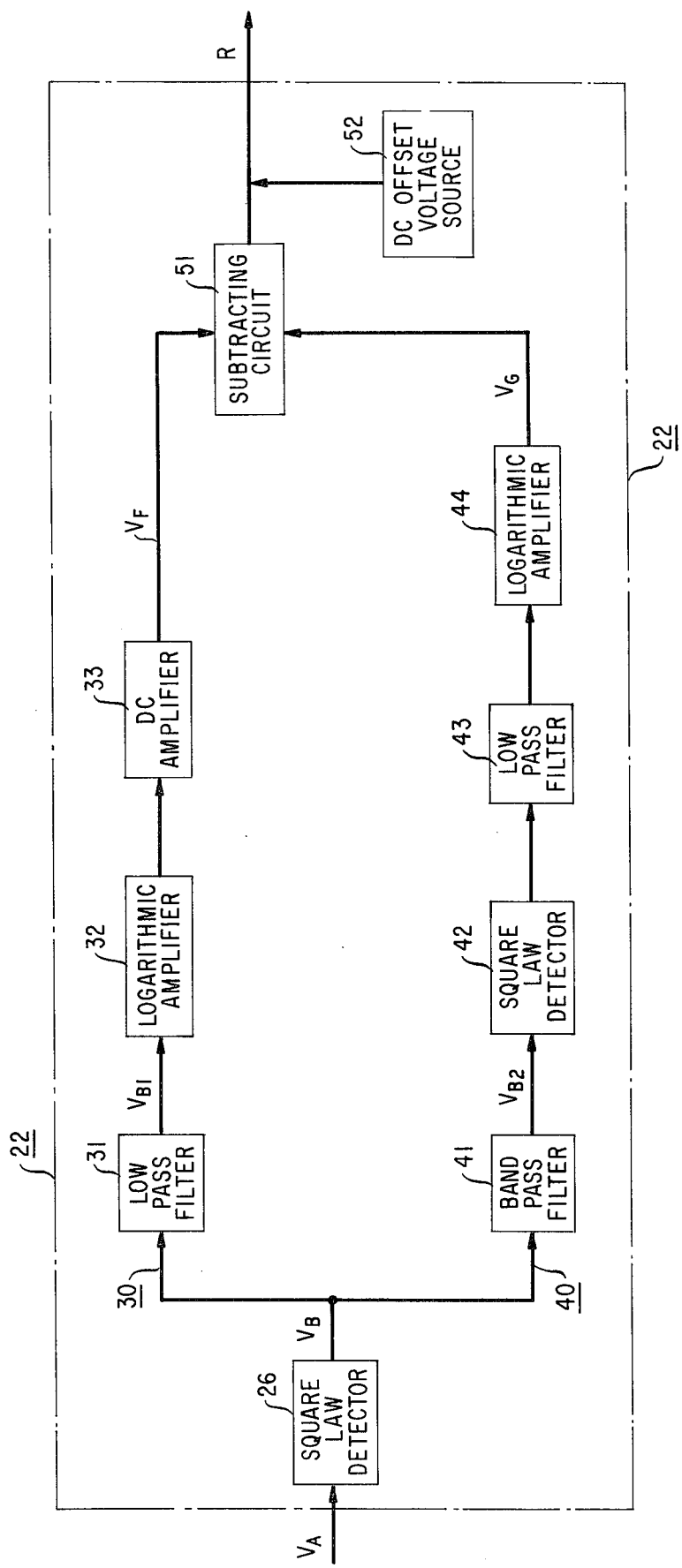
FIG. 2 is a block diagram of a channel-switching initiation arrangement suitable for use in the arrangement of FIG. 1 and constructed in accordance with the invention.

As shown best in FIG. 2, the improved initiator 22 includes an input detector 26, which is arranged to yield a very precise square-law output characteristic. In particular, the detector 26 may be of the type described, e.g., in one of the following articles: R. H. Fraether, "Wideband Multiplier-Square-Law Detector", Review of Scientific Instruments, Volume 35, pages 810–813 (July 1964); J. E. Longfoot, "Survey of Square-Law Devices", *Proceedings of the IRE (Australia), Volume* 24, No. 5, pages 430–439 (May 1963); and R. H. Wilcox, "Use of a Diode Ring as a 4-Quadrant Multiplier", *Review of Scientific Instruments,* Volume 30, No. 11, pages 1009–1011 (November 1959).

The output $V_B = V_A^2$ of the square-law detector 26 consists of three components:

$$V_{B1} \approx \tfrac{1}{2} S_O^2$$

$$V_{B2} = S_O I_O \cos[(\omega_S - \omega_I)t + (P_S - P_I)]$$

$$V_{B3} = \frac{S_O^2}{2} \cos[2\omega_S t + 2P_S]$$

$$+ \frac{I_O^2}{2} \cos[2\omega_I t + 2P_I]$$

$$+ S_O I_O \cos[(\omega_S + \omega_I)t + (P_S + P_I)].$$

Thus, the signal $V_B$ includes (1) a DC component representing the power of the information signal, (2) a low-frequency component representing the cross-product of the amplitudes of the information signal and the interference, and (3) a composite high-frequency component to be eliminated by filtering in the manner indicated below.

The voltage $V_B$ is applied to a first branch 30 for generating a signal $V_F$ representative generally of the numerator of the ratio R. To accomplish this, a low-pass filter 31 extracts the DC component $V_{B1}$ which is converted, in a logarithmic amplifier 32, into a voltage of the form $$10 \log_{10}\left[\frac{S_O^2}{2}\right].$$

The output voltage of the converter 32 is coupled to the input of a DC amplifier 33, which is illustratively arranged to have a gain of two. Accordingly, the signal output $V_F$ from the amplifier 33 is given by the expression $$V_F = 2 \times 10 \log_{10}\left[\frac{S_O^2}{2}\right]$$

$$= 2 \times [10 \log_{10} S_O^2 - \log_{10}(2)].$$

The branch 30 is shunted by a second branch 40 for extracting a signal $V_G$ representative of the denominator of the desired signal to interference ratio R. For this purpose the voltage $V_B$ at the output of the detector 26 is applied to a a band-pass filter 41, whose bandwidth includes the frequency of the component $V_{B2}$ and extends down to but not including zero frequency. The filter 41 may conventionally be embodied as a low-pass filter in series with a capacitor.

Since the frequency of the difference-beat signal component $V_{B2}$ at the output of the detector 26 has a term within the bandwidth of the filter 41, such component will appear at the output of such filter. By contrast, the component $V_{B3}$ (i.e., the signal representing the sum of the information and interference frequencies together with the terms representing signals at twice the respective frequencies), will be rejected by the filter 41.

The output of the filter 41 is coupled to the input of a second square-law detector 42, whose characteristic need not be as precise as that of the detector 26. The amplitude of the output of the detector 42 at the difference frequency $(\omega_S - \omega_I)$ may be represented as $$\tfrac{1}{2} S_O^2 I_O^2,$$

and may be extracted by a second low-pass filter 43.

The output of the filter 43 is coupled to a logarithmic amplifier 44, which may be identical to the amplifier 32 in the branch 30. The output of the amplifier 44, representing the voltage $V_G$, is therefore of the form $$V_G = 10 \log_{10} \frac{S_O^2 I_O^2}{2}$$

$$= 10 \log_{10} S_O^2 + 10 \log_{10} I_O^2 - 10 \log_{10}(2)$$

Since R can be represented as $$10 \log_{10} S_O^2 - 10 \log_{10} I_O^2,$$

it is apparent that R is proportional to the difference of $V_F$ and $V_G$. Accordingly, the respective outputs of the branches 30 and 40 are coupled to the sum and difference inputs, respectively, of a subtraction circuit 51, whose output constitutes the output 23 of the initiator 22.

The quantitative difference between the value $(V_F - V_G)$ and the desired value R is $$10 \log_{10}(2) = 3DB.$$

Accordingly, a DC offset signal of suitable amplitude is provided by means of a source 52 at the output of the subtracting circuit 51. The channel switching signal at the output 23 of the initiator 23 therefore corresponds to the quantity R.

As a result of the above, a switch request will be initiated whenever the signal-to-interference ratio present if the IF portion of the receiving station 11 falls below a predetermined threshold value established, in a conventional manner, in the remaining portions of the switch initiating system. Such remaining portions, which are not depicted in the drawing, are fully disclosed in the above-mentioned Bell System Technical Journal Article.

The above-described improved arrangement for the initiator 22 will be effective for properly initiating a switch request on the line 23 even in the aggravated case where the desired signal incident on the antenna 12 is accompanied by multiple interference (e.g., M separate interfering components with arbitrary envelopes) and noise, rather than just a single constant-envelope interference signal as assumed above. Under such circumstances, the voltage $V_A$ applied to the input of the initiator 22 can be represented by the following equation:

$$V_A = S_O \cos(\omega_S t + P_S) + \sum_{j=1}^{M} I_{Oj} \cos(\omega_j t + P_j) + N,$$

where N represents the noise within the bandwidth of the IF filter 16. The corresponding output $V_B$ of the detector 26, after processing by the branch 30 as before, will yield a voltage $V_F$ of the form $$V_F \approx 2 [10 \log S_O^2 - 10 \log_{10}(2)].$$

By contrast, the voltage $V_G$ generated by subjecting the signal $V_B$ from the detector 26 to the branch 40 will be of the form $$V_G \approx 10 \log_{10} S_O^2 + 10 \log_{10}\left[ N_{RMS}^2 + \sum_{j=1}^{M} I_{0jRMS}^2 \right] - 10 \log_{10}(2).$$

Where $N^2_{RMS}$ represents the mean square power of the noise and $I^2_{0jRMS}$ represents the mean square power of the jth interferer. Under such circumstances, the voltage at the output of the subtracting circuit 51, as modified by the DC offset source 52, can be represented by $$10 \cdot \log_{10} \frac{S_O^2}{N_{RMS}^2 + \sum_{j=1}^{M} I_{0jRMS}^2},$$

which is equal to the ratio of the information signal to the accompanying multiple interference and noise. The initiator 22 will accordingly provide the desired switch request on the output 23 irrespective of whether the interference accompanying the information signal is single or multiple, and whether or not accompanied by channel noise.

In the foregoing, an illustrative arrangement of the invention has been described. Many variations and modifications will now occur to those skilled in the art. For example, while the combined information-interference signal $V_A$ has been assumed to be an IF signal, the above-described arrangement can easily be adapted for RF processing. It is accordingly desired that the scope of the appended claims not be limited to the specific disclosure herein contained.

What is claimed is:

1. In an apparatus for generating a first quantity indicative of the amplitude ratio of a desired information component and an undesired interference component of an interference-susceptible radio signal:
    first and second square-law detecting means;
    first and second low-pass filter means;
    band-pass filter means having a passband extending substantially down to but not including zero frequency;
    first and second logarithmic amplifier means;
    means for coupling a replica of the radio signal to the input of the first detecting means;
    means for coupling the output of the first detecting means to the inputs of the first low-pass filter means and the band-pass filter means, respectively;
    means for coupling the output of the first low-pass filter means to the input of the first logarithmic amplifier means;
    means including the second detecting means and the second low-pass filter means for coupling the output band-pass filter means to the second logarithmic amplifier means; and
    means responsive to the outputs of the first and second logarithmic amplifier means for generating, as the first quantity, a signal proportional to the difference between the outputs of the first and second logarithmic amplifier means.

2. Apparatus as defined in claim 1, in which the generating means comprises, in combination, subtracting means having first and second inputs, means for coupling the output of the first logarithmic amplifier means to the first input of the subtracting means, and means for coupling the output of the second logarithmic amplifier means to the second input of the subtracting means, the output of the subtracting means being proportional to the first quantity.

3. Apparatus as described in claim 2, in which the means for coupling the output of the first logarithmic amplifier means to the first input of the subtracting means comprises a DC amplifier.

4. Apparatus as defined in claim 2, in which the gain of the DC amplifier is two.

5. Apparatus as defined in claim 1, in which the apparatus further comprises means coupled to the output of the subtracting means for superimposing a fixed DC voltage on said last-mentioned output.

* * * * *